US012767911B2

(12) United States Patent
Van Beneden et al.

(10) Patent No.: US 12,767,911 B2
(45) Date of Patent: Oct. 20, 2026

(54) ALCOHOLIC BEVERAGE CONTAINING SUSPENDED PARTICULATES

(71) Applicant: Cargill, Incorporated, Wayzata, MN (US)

(72) Inventors: Wouter M. G. M. Van Beneden, Mariakerke (BE); Reginald Van Bokkelen, Braine-l'Alleud (BE)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 16/631,105

(22) PCT Filed: Jul. 20, 2017

(86) PCT No.: PCT/US2017/043062
§ 371 (c)(1),
(2) Date: Jan. 14, 2020

(87) PCT Pub. No.: WO2019/017950
PCT Pub. Date: Jan. 24, 2019

(65) Prior Publication Data
US 2020/0157481 A1 May 21, 2020

(51) Int. Cl.
*C12G 3/04* (2019.01)
*C12G 3/05* (2019.01)

(52) U.S. Cl.
CPC ................ *C12G 3/04* (2013.01); *C12G 3/05* (2019.02)

(58) Field of Classification Search
CPC .................................. C12G 3/04; C12G 3/05
USPC .......................................................... 426/592
See application file for complete search history.

(56) References Cited

U.S. PATENT DOCUMENTS 1,054,829 A 3/1913 Cornelius
5,597,604 A 1/1997 Chalupa
6,106,883 A * 8/2000 Sokolik .................... C12G 3/04 426/573
9,715,200 B2 7/2017 Shimura et al.
2003/0215548 A1* 11/2003 Mihajlovic .............. A23G 9/42 426/101
2007/0128317 A1 6/2007 Helfend
2010/0112499 A1 5/2010 Poenkaenen
2011/0027427 A1* 2/2011 Panyam ................... A23G 9/06 426/112
2012/0034351 A1* 2/2012 Sridhar ................. A23L 29/206 426/573
2012/0251687 A1 10/2012 Van Dijk
2013/0302502 A1 11/2013 Yuan
(Continued)

FOREIGN PATENT DOCUMENTS

EP 1081220 A1 3/2001
EP 2270125 B1 5/2017
JP 2009136159 A 6/2009
(Continued)

OTHER PUBLICATIONS

Percent alcohol conversion calculator, Pro Brewer accessed at https://www.probrewer.com/tools/percent-alcohol-conversion-calculator/ on Nov. 27, 2023.*
(Continued)

*Primary Examiner* — Nikki H. Dees
*Assistant Examiner* — Philip A Dubois

(57) ABSTRACT

The invention relates to an alcoholic beverage comprising xanthan and a galactomannan.

12 Claims, 3 Drawing Sheets

Xanthan stability

| | pH | Sugar (%) | Alcohol (%) | 5 | 10 | 15 | 20 | 25 | 30 | 35 | 40 |
|---|---|---|---|---|---|---|---|---|---|---|---|
| Xanthan (g/l) | 3 | 0 | | 0.044 | 0.048 | 0.052 | | | | | |
| | | | | | | | | | | | |
| Xanthan (g/l) | 3 | 10 | | 0.046 | 0.052 | 0.058 | 0.064 | 0.071 | 0.077 | 0.083 | 0.090 |
| Xanthan (g/l) | 7 | 10 | | 0.046 | 0.052 | 0.058 | 0.064 | 0.071 | 0.077 | 0.083 | 0.090 |
| | | | | | | | | | | | |
| Xanthan (g/l) | 3 | 20 | | 0.096 | 0.103 | 0.111 | 0.119 | 0.126 | 0.134 | 0.142 | 0.150 |
| Xanthan (g/l) | 7 | 20 | | 0.096 | 0.103 | 0.111 | 0.119 | 0.126 | 0.134 | 0.142 | 0.150 |

(56) References Cited

U.S. PATENT DOCUMENTS

| | | | |
|---|---|---|---|
| 2014/0210326 | A1 | 7/2014 | Ceballos Godefroy |

FOREIGN PATENT DOCUMENTS

| | | | | | |
|---|---|---|---|---|---|
| JP | 2010220529 | A | 10/2010 | | |
| JP | 2012024081 | A | 2/2012 | | |
| JP | 2015159790 | A | 9/2015 | | |
| RU | 2427288 | C2 | 8/2011 | | |
| WO | 9715200 | W | 5/1997 | | |
| WO | 0030468 | | * | 6/2000 | ............ A23G 9/045 |
| WO | 0030468 | W | 6/2000 | | |
| WO | 2000030468 | A1 | 6/2000 | | |
| WO | 2009014116 | A1 | 1/2009 | | |
| WO | 2010019036 | A2 | 2/2010 | | |
| WO | 2010/054829 | A1 | 5/2010 | | |
| WO | 2010/112499 | A1 | 10/2010 | | |
| WO | 2014210326 | A2 | 12/2014 | | |

OTHER PUBLICATIONS

Aramouni, et al, Effects of xanthan-locust bean gum mixtures on the physicochemical properties and oxidative stability of whey protein stabilised oil-in-water emulsions, Food Chemistry 167 (2015) 340-348.*

Neathery, B., How Much Alcohol Is In Whiskey?, Oak & Eden, https://oakandeden.com/blogs/journal/how-much-alcohol-is-in-whiskey-oak- den#:~:text=Into%20The%20Bottle:%2040%20Percent%20ABV%20The,and%2062%20and%20a%20half%20percent%20ABV, (2022) teaches that the ABV of whiskey can be as mush as 62.5%, 2022 (Neathery).*

Intermolecular hydrogen bonding schematic diagram of galactomannan.

Polysaccharide Thickeners (Fermentation-derived Polysaccharides: Gellan Gum, Xanthan Gum, and Fermentation-derived Cellulose).

* cited by examiner

Xanthan stability

| | pH | Sugar (%) | Alcohol (%) | 5 | 10 | 15 | 20 | 25 | 30 | 35 | 40 |
|---|---|---|---|---|---|---|---|---|---|---|---|
| Xanthan (g/l) | 3 | 0 | | 0.044 | 0.048 | 0.052 | | | | | |
| | | | | | | | | | | | |
| Xanthan (g/l) | 3 | 10 | | 0.046 | 0.052 | 0.058 | 0.064 | 0.071 | 0.077 | 0.083 | 0.090 |
| Xanthan (g/l) | 7 | 10 | | 0.046 | 0.052 | 0.058 | 0.064 | 0.071 | 0.077 | 0.083 | 0.090 |
| | | | | | | | | | | | |
| Xanthan (g/l) | 3 | 20 | | 0.096 | 0.103 | 0.111 | 0.119 | 0.126 | 0.134 | 0.142 | 0.150 |
| Xanthan (g/l) | 7 | 20 | | 0.096 | 0.103 | 0.111 | 0.119 | 0.126 | 0.134 | 0.142 | 0.150 |

Figure 1

Guar gum stability

| | pH | Sugar (%) | Alcohol (%) | 5 | 10 | 15 | 20 | 25 | 30 | 35 | 40 |
|---|---|---|---|---|---|---|---|---|---|---|---|
| Guar (g/l) | 3 | 0 | | 0.202 | 0.23 | 0.258 | 0.286 | precipitation | | | |
| | | | | | | | | | | | |
| Guar (g/l) | 3 | 10 | | 0.24 | 0.287 | 0.334 | precipitation | | | | |
| Guar (g/l) | 7 | 10 | | 0.24 | 0.287 | 0.334 | | | | | |
| | | | | | | | | | | | |
| Guar (g/l) | 3 | 20 | | 0.35 | 0.38 | 0.42 | precipitation | | | | |
| Guar (g/l) | 7 | 20 | | 0.35 | 0.38 | 0.42 | | | | | |

Figure 2

LBG stability

| | pH | Sugar (%) | Alcohol (%) | 5 | 10 | 15 | 20 | 25 | 30 | 35 | 40 |
|---|---|---|---|---|---|---|---|---|---|---|---|
| LBG (g/l) | 3 | 0 | | 0.202 | 0.23 | 0.258 | precipitation | | | | |
| | | | | | | | | | | | |
| LBG (g/l) | 3 | 10 | | 0.24 | 0.287 | 0.334 | precipitation | | | | |
| LBG (g/l) | 7 | 10 | | 0.24 | 0.287 | 0.334 | | | | | |
| | | | | | | | | | | | |
| | | | | | | | | | | | |
| LBG (g/l) | 3 | 20 | | 0.35 | 0.38 | 0.42 | precipitation | | | | |
| LBG (g/l) | 7 | 20 | | 0.35 | 0.38 | 0.42 | | | | | |

Figure 3

ALCOHOLIC BEVERAGE CONTAINING SUSPENDED PARTICULATES

CROSS REFERENCE TO RELATED APPLICATIONS

This application is a national phase application of PCT/US17/43062, filed 20 Jul. 2017, entitled ALCOHOLIC BEVERAGE CONTAINING SUSPENDED PARTICULATES, which is hereby incorporated by reference in it's entirety.

FIELD OF THE INVENTION

The invention relates to alcoholic beverages. In particular, the invention relates to alcoholic beverages comprising stabilized suspended particulate matter, and methods for production.

BACKGROUND

Alcoholic beverages containing suspended particulates are well-known. Some examples are vodka or schnapps containing suspended gold leaf flakes. Alcoholic beverages containing stabilized particles of nut material are also described in WO 2010/019036 A2.

Other types of beverages containing suspended particles are known. US2012/0034351 A1 describes a carbonated beverage with a soft jelly texture. The beverage contains inclusions of gel beads, fruit bits, seeds, or processed plant products suspended uniformly in the beverage.

Hydrocolloids (or "gums"), especially gellan gum, are traditionally used to stabilize beverages. For instance, US2013/0302502 A1 discloses non-alcoholic beverages comprising a low calcium sensitive high acyl gellan gum for stabilizing suspensions of particulate matter. U.S. Pat. No. 5,597,604 discloses an alcoholic "screwdriver" drink containing gellan gum. Gellan Gum is a hydrocolloid produced by the microorganism *Sphingomonas elodea*, which is currently sold under the trademark KELCOGEL®.

There are several drawbacks associated with the use of gellan gum in beverage manufacture. In particular, gellan gum is highly sensitive to the presence of cations, which inhibits hydration. Increased cation levels causes rapid, uncontrollable, gel formation, which can result in the loss of entire batches. The level of cations must therefore be carefully controlled during hydration of gellan gum, for example by using an ion sequestering agent, such as sodium citrate, sodium tripolyphosphate, sodium hexametaphosphate, EDTA, or trisodiumpolyphosphate. However, the use of such an agent increases the complexity of the beverage recipe, may add costs and may have a negative perception on the consumer. Another disadvantage of gellan gum is that it is relatively expensive to produce and difficult to handle as it requires temperatures above 90° C. for its hydration, the typical beverage plants not having the facilities to handle such increased temperatures.

Other gelling agents that have been used previously to stabilize alcoholic beverages include microcrystalline cellulose and carboxymethyl cellulose (WO2010/019036 A2), carrageenan (EP1081 220 A1), propylene glycol alginate and pectin (US2012/0251687 A1).

Currently available alcoholic beverages that are stabilized with gelling agents and in particular those containing suspended particulates have undesirable physical and rheological properties, including a relatively high viscosity. This results in a "gelatinous" texture which many consumers find unappealing in terms of mouthfeel. The visual appearance may also be adversely affected.

There remains an unmet need for alcoholic beverages in particular for those containing stable suspensions of particulates which not only have a more desirable appearance and mouthfeel than conventional such products, but which can also be manufactured with increased reliability, e.g. without the need of carefully controlling the amount of cations during hydration.

SUMMARY OF INVENTION

The present invention, which seeks to addresses the problems identified above, provides an alcoholic beverage comprising xanthan and a galactomannan.

The weight ratio of the xanthan and the galactomannan in the alcoholic beverage may be between 80:20 and 20:80 (wt. %), preferably between 75:25 and 25:75, more preferably between 70:30 and 30:70, even more preferably between 65:35 and 35:65, yet even more preferably between 60:40 and 40:60, most preferably between 55:45 and 45:55. In preferred embodiments, the ratio of xanthan to galactomannan is about 50:50.

The galactomannan may be selected from the group comprising or consisting of fenugreek gum, guar gum, tara gum, locust bean gum (LBG), or any combination of two or more thereof. In preferred embodiments, the galactomannan is LBG.

In preferred embodiments, the galactomannan is LBG and the xanthan and LBG are in a weight ratio of between 80:20 and 20:80 (wt. %), preferably between 75:25 and 25:75, more preferably between 70:30 and 30:70, even more preferably between 65:35 and 35:65, yet even more preferably between 60:40 and 40:60, most preferably between 55:45 and 45:55. In preferred embodiments, the weight ratio of xanthan to LBG is about 50:50.

The alcoholic beverage preferably contains xanthan in an amount of at least 0.001 wt % relative to the total weight of the beverage, more preferably at least 0.002 wt %, most preferably at least 0.003 wt %. The amount of xanthan is preferably at most 0.2 wt %, more preferably at most 0.02 wt %, most preferably at most 0.008 wt %. Preferably, the alcoholic beverage preferably contains xanthan in an amount of about 0.005 wt %.

The alcoholic beverage preferably contains galactomannan in an amount of at least 0.001 wt % relative to the total weight of the beverage, more preferably at least 0.002 wt %, most preferably at least 0.003 wt %. The amount of galactomannan is preferably at most 0.01 wt %, more preferably at most 0.008 wt %, most preferably at most 0.006 wt %. Preferably the alcoholic beverage preferably contains galactomannan in an amount of about 0.005 wt %.

In a preferred embodiment, the galactomannan is LBG, the LBG being present in the beverage in an amount of at least 0.001 wt % relative to the total weight of the beverage, more preferably at least 0.002 wt %, most preferably at least 0.003 wt %. The amount of LBG is preferably at most 0.01 wt %, more preferably at most 0.008 wt %, most preferably at most 0.006 wt %. In a preferred embodiment, the galactomannan is LBG, the LBG being present in the beverage in an amount of about 0.005 wt %.

In some embodiments, the alcoholic beverage may further comprise inclusions suspended in the beverage. The inclusions may include, without limitation, microspheres, gel beads, fruit pieces, flakes, seeds, other plant products or other edible particulate matter, or any combination of two or more thereof.

The alcoholic beverage preferably has a yield stress of at least 5.0 mPa, more preferably at least 7.5 mPa, even more preferably at least 10.0 mPa, yet even more preferably at least 15.0 mPa, most preferably at least 18 mPa. Preferably, said yield stress is at most 80.0 mPa, more preferably at most 70.0 mPa, most preferably at most 60.0 mPa.

The alcoholic beverage preferably has a viscosity of at most 80 mPa·s, more preferably at most 60 mPa·s, even more preferably at most 40 mPA·s, even more preferably at most 25 mPa·s, most preferably at most 15 mPa·s. Said viscosity is preferably at least 5.0 mPa·s, more preferably at least 7.5 mPa·s, most preferably at least 10.0 mPA·s.

In preferred embodiments, the alcoholic beverage has a yield stress of at least 8 mPa and a viscosity of at most 35 mPa·s. In such preferred embodiments, the viscosity is preferably at most 25 mPa·s, and most preferably at most 15 mPa·s.

In preferred embodiments, the alcoholic beverage has a yield stress of at least 15 mPa and a viscosity of at most 35 mPa·s. In such preferred embodiments, the viscosity is preferably at most 25 mPa·s, and most preferably at most 15 mPa·s.

The alcoholic beverage preferably has a pH of between 3 and 10. More preferably, the alcoholic beverage may have a pH of between 5 and 9.

The alcoholic beverage preferably has an alcohol content of at least 15 vol %, more preferably at least 20 vol %, even more preferably at least 25 vol %, most preferably at least 30 vol %. Said alcohol content is preferably at most 45 vol %, more preferably at most 40 vol %, most preferably at most 37.5 vol %. The alcohol is preferably ethanol.

The alcoholic beverage may further comprise, without limitation, sugar, food-grade acid(s), calcium source(s), nutritive and non-nutritive sweetener(s), preservative(s), colouring(s), flavouring(s), functional ingredient(s), or any combination of two or more thereof.

The invention further provides a process for producing an alcoholic beverage. The process comprises the steps of:

providing a first solution of xanthan and a galactomannan; and allowing said first solution to rest for a resting period of time; and mixing said first solution with a second solution comprising an alcohol to obtain a beverage having an alcohol content of at least 15 vol %.

The resting period is at least 1 hour, preferably at least 10 hours, more preferably at least 18 hours, even more preferably at least 24 h, yet even more preferably at least 48 h, most preferably at least 72 h. Preferably, the resting period is carried out at room temperature under ambient conditions. Preferably, the resting period is sufficient for the xanthan to encapsulate the galactomannan.

Preferably, the solution at step a) is an aqueous solution. Said solution preferably contains water in an amount that is at most 50% higher than the combined amounts of xanthan and galactomannan, more preferably at most 35% higher, even more preferably at most 20% higher. Preferably, said solution contains water in an amount that is at least 5% higher, more preferably at least 10% higher.

Preferably, the solution at step a) is made by mixing an aqueous solution containing xanthan with an aqueous solution containing galactomannan, e.g. LBG. Preferably, while making said solutions, the temperature is increased to aid in the solubilisation of the xanthan and galactomannan.

In some embodiments, the first solution and/or the second solution are/is an aqueous solution.

The ratio of the xanthan and the galactomannan in the first solution is preferably between 80:20 and 20:80 (wt. %), preferably between 75:25 and 25:75, more preferably between 70:30 and 30:70, even more preferably between 65:35 and 35:65, yet even more preferably between 60:40 and 40:60, most preferably between 55:45 and 45:55. In preferred embodiments, the ratio of xanthan to galactomannan is about 50:50.

The galactomannan used in the first solution may be selected from the group comprising or consisting of fenugreek gum, guar gum, tara gum, locust bean gum (LBG), or any other known galactomannan, or any combination of two or more thereof. In preferred embodiments, the galactomannan is LBG.

In preferred embodiments, the galactomannan used in the first solution is LBG and the xanthan and LBG are in a ratio of between 80:20 and 20:80 (wt. %), preferably between 75:25 and 25:75, more preferably between 70:30 and 30:70, even more preferably between 65:35 and 35:65, yet even more preferably between 60:40 and 40:60, most preferably between 55:45 and 45:55. In preferred embodiments, the ratio of xanthan to LBG is about 50:50.

In some embodiments, the method further comprises adding inclusions after the resting period, either before or after the second solution is mixed with the first solution. The inclusions may include, without limitation, microspheres, gel beads, fruit pieces, flakes, or other particulate matter such as indicated above.

The second solution contains water and alcohol in the amounts necessary to reach the desired alcohol amount in the final beverage. The skilled person can routinely adjust said amounts.

In some embodiments, the method further comprises adding other ingredients after the resting period, either before or after the second solution is mixed with the first solution. The other ingredients may comprise, without limitation, sugar, food-grade acid(s), calcium source(s), nutritive and non-nutritive sweetener(s), preservative(s), colouring(s), flavouring(s), functional ingredient(s), or any combination of two or more of these.

BRIEF DESCRIPTION OF THE FIGURES

In the accompanying drawings:

FIG. 1: shows alcoholic beverages comprising xanthan in different concentrations at different pH levels and concentrations of alcohol and sugar.

FIG. 2: shows alcoholic beverages comprising guar gum in different concentrations at different pH levels and concentrations of alcohol and sugar.

FIG. 3: shows alcoholic beverages comprising LBG in different concentrations at different pH levels and concentrations of alcohol and sugar.

DETAILED DESCRIPTION OF THE INVENTION

It was found that an excellent, stable, alcoholic beverage can be produced using a combination of xanthan gum ("xanthan") and a galactomannan as stabilizers. The beverage has desirable physical and rheological properties that enable the stable suspension of inclusions or particulates. The beverage described herein has a more desirable appearance and mouthfeel than conventional alcoholic beverages in particular those that contain particulates. Moreover, the beverage is a low cost-alternative because xanthan and galactomannan are less expensive than gellan gum. The alcoholic beverage may also be produced without the use of ion sequestering agents.

Xanthan gum is a polysaccharide secreted by the bacterium *Xanthomonas campestris*, commonly used as a as a food thickening agent. It is composed of pentasaccharide repeat units, comprising glucose, mannose, and glucuronic acid in the molar ratio 2:2:1. It is produced by the fermentation of glucose, sucrose, or lactose. After a fermentation period, the polysaccharide is precipitated from a growth medium with isopropyl alcohol, dried, and ground into a fine powder. Later, it is added to a liquid medium to form the gum Galactomannans are polysaccharides consisting of a mannose backbone with galactose side groups (more specifically, a (1-4)-linked beta-D-mannopyranose backbone with branchpoints from their 6-positions linked to alpha-D-galactose, i.e. 1-6-linked alpha-D-galactopyranose). Galactomannans are often used in food products to increase the viscosity of the water phase Xanthan and galactomannans have previously been used as stabilizing ingredients in beverage manufacture, but it has been unexpectedly found that the combination of these results in an alcoholic beverage with particularly desirable yield stress and viscosity characteristics. Suitable galactomannans for use in the alcoholic beverage of the invention are fenugreek gum, guar gum, tara gum, and locust bean gum (LBG). Preferably, the galactomannan used is LBG. In some embodiments a combination of two or more galactomannans may be used.

The ability of a fluid to stabilize and suspend particulate matter is, to a large extent, dependent upon the yield stress of the fluid. Yield stress is the applied force required to make a structured fluid flow. Generally, the higher the yield stress, the more inhibition there will be to flow. Where the effect of gravity on the particulates in the fluid is less than the yield stress of the system, a stable suspension may be formed.

The alcoholic beverage preferably has a yield stress of at least 5.0 mPa, more preferably at least 7.5 mPa, even more preferably at least 10.0 mPa, yet even more preferably at least 15.0 mPa, most preferably at least 18 mPa. Preferably, said yield stress is at most 80.0 mPa, more preferably at most 70.0 mPa, most preferably at most 60.0 mPa. Thus, a stable suspension of particulates of varying size and density may be achieved.

In preferred embodiments, the alcoholic beverage has a yield stress of at least 8 mPa and a viscosity of at most 35 mPa·s. In such preferred embodiments, the viscosity is preferably at most 25 mPa·s, and most preferably at most 15 mPa·s.

In preferred embodiments, the alcoholic beverage has a yield stress of at least 15 mPa and a viscosity of at most 35 mPa·s. In such preferred embodiments, the viscosity is preferably at most 25 mPa·s, and most preferably at most 15 mPa·s.

The viscosity of a beverage has a large impact on its mouthfeel. Highly viscous fluids tend to leave an unpleasant feel in the mouth. Currently available particulate-containing alcoholic beverages have a relatively high viscosity.

The alcoholic beverage preferably has a viscosity of at most 80 mPa·s, more preferably at most 60 mPa·s, even more preferably at most 40 mPA·s, even more preferably at most 25 mPa·s, most preferably at most 15 mPa·s. Said viscosity is preferably at least 5.0 mPa·s, more preferably at least 7.5 mPa·s, most preferably at least 10.0 mPa·s. This results in the alcoholic beverages of the present invention having an improved mouthfeel compared to conventional particulate-containing alcoholic beverages, making them more appealing to consumers.

As shown in FIG. 1, xanthan successfully stabilizes suspensions at alcohol concentrations of 5% (v/v) to 40% (v/v) and sugar concentrations of 10% to 20% at a pH 3 or pH 7. No precipitation was observed.

Galactomannans, on the other hand, are sensitive to alcohol and sugar concentrations. As shown in FIG. 2, guar gum precipitates at alcohol concentrations above 15% (v/v) at lower sugar concentrations. At higher sugar concentrations, precipitation occurs above 10% (v/v) alcohol. FIG. 3 shows that LBG precipitates above 15% (v/v) alcohol regardless of sugar concentration.

The inventors however surprisingly observed that by using the method of the present invention, it is possible to manufacture stable beverages comprising a galactomannan, which have an alcohol concentration of 15% (v/v) or higher, without precipitation.

The method involves first providing an initial solution of xanthan and a galactomannan and then allowing the solution to rest before adding the alcohol. Without being bound by theory, it is thought that by allowing the solution to rest, the galactomannan becomes encapsulated by the xanthan, preventing it from precipitating when the alcohol is added. By "encapsulated" it is meant that the galactomannan is sufficiently shielded from the surrounding alcohol environment to prevent precipitation. The galactomannan may be fully or partially encapsulated provided that the encapsulation is sufficient to prevent precipitation.

The resting period must be sufficient to prevent precipitation, e.g. by allowing for the xanthan to encapsulate the galactomannan, which is at least 1 hour, preferably at least 10 hours, more preferably at least 18 hours, even more preferably at least 24 h, yet even more preferably at least 48 h, most preferably at least 72 h. The exact length of the resting period is dependant the specific conditions, especially upon the type of galactomannan used. The skilled person would be able to determine the appropriate resting period for a given galactomannan. The resting period is preferably carried out at room temperature under ambient conditions.

After the resting period, the alcohol is mixed with the solution of xanthan and galactomannan. Mixing may be performed under agitation. Mixing may be by any known method including, for example, using a stirrer, blender, or homogeniser.

The ratio of the xanthan to the galactomannan is important for achieving desired levels of encapsulation. The ratio of the xanthan and the galactomannan in the alcoholic beverage may be between about 80:20 and about 20:80 (wt. %), preferred embodiments being given above and will not be repeated herein. In preferred embodiments, the ratio of xanthan to galactomannan is about 50:50.

In some embodiments, the concentration of xanthan is at least about 0.001 wt %, and the concentration of the galactomannan is at least about 0.001 wt %. When the galactomannan used is LBG, the LBG is preferably used in an amount of at least about 0.001 wt %. Preferred concentration ranges were given above and will not be repeated herein.

The pH of the alcoholic beverage described herein is preferably from about 3 to about 10, because this is the normal pH range for commercial alcoholic beverages. More preferably, the pH is from about 5 to about 9.

The invention further provides a second method to manufacture the beverages of the invention, comprising the steps of:

a) Providing a dry blend of xanthan and a galactomannan, preferred embodiments of the galactomannan being given hereinabove, most preferably the galactomannan being LBG, wherein the ratio between xanthan and galactomannan is preferably between 80:20 and 20:80;
b) Forming an aqueous solution by dissolving the dry blend in water at a temperature of above 50° C., more preferably above 60° C., even more preferably above 70° C., most preferably above 80° C., under high shear stirring, preferably under a stirring of above 500 rpm, more preferably above 1000 rpm, even more preferably above 1500 rpm, yet even more preferably above 2000 rpm, yet even more preferably above 2500 rpm, most preferably above 3000 rpm;
c) Allowing the blend to cool to room temperature under stirring, while preferably reducing the stirring to a stirring speed of at most 400 rpm, more preferably at most 300 rpm, most preferably at most 200 rpm;
d) Optionally adding any remaining ingredients, e.g. alcohol, sugar syrups, buffer solutions and particulates to form a final beverage preferably containing suspended particulates.

Preferred ratios of xanthan:galactomannan are given hereinabove and will not be repeated. The concentration of the xanthan/galactomannan blend in the aqueous solution is preferably at least 0.01 wt % relative to the total weight of said solution, more preferably at least 0.03 wt %, even more preferably at least 0.05 wt %, yet even more preferably at least 0.07 wt %, more preferably at least 0.10 wt %. Preferably said concentration of said blend in said formulation is at most 3.0 wt %, more preferably at most 1.0 wt %, even more preferably at most 0.7 wt %, most preferably at most 0.5 wt %. Preferably, the concentration of particulates, if used to suspend in the final beverage, is at least 0.01 wt % relative to the total weight of said beverage, more preferably at least 0.03 wt %, most preferably at least 0.05 wt %. Preferably, the concentration of said particulates is at most 3.0 wt %, more preferably at most 1.0 wt %, even more preferably at most 0.7 wt %, yet even more preferably at most 0.5 wt %, yet even more preferably at most 0.3 wt %, most preferably at most 0.1 wt %.

Inclusions that may be suspended in the alcoholic beverages of the invention are wide-ranging, including, without limitation, microspheres, gel beads, fruit pieces, flakes, or other edible particulate matter such as those enumerated above. These inclusions provide a unique taste, texture, and/or visual appeal to the beverages. Any additives, solvents and the like are not counted with the inclusions. The inclusions may substantially uniformly distributed throughout the beverage.

The inclusions may have sizes within wide ranges, e.g. 0.1 mm to 10 mm or from about 0.1 mm to about 5 mm and their concentration in the beverage may vary anywhere between 0.1 wt % 2.0 wt % relative to the total weight of the beverage. Inclusions may include, without limitation, microspheres, gel beads, fruit pieces, flakes, seeds, other plant products or other edible particulate matter, or any combination of two or more thereof. The gel beads could be made with agar, alginate, pectin, wax, carboxymethyl cellulose, guar, cellulose or combinations of one or more of such ingredients. The inclusions can be of generally consistent size or vary in size. These inclusions may be colored, flavored, contain filler ingredients such as silica, preservatives, acid, functional ingredients such as vitamins or antioxidants, fiber and combinations of these ingredients. Fruit inclusions include, without limitation, real fruit pieces, fruit peels (grapefruit, lemon, orange), fruit pulp (orange, lemon, grapefruit), fruit zest (lemon, orange) or processed fruit meat from berries, tropical fruits, citrus and combinations of these fruits. Other inclusions include, without limitation coconut meat, black pepper, basil seed, fennel seed, ginger, wild starch pearls, tapioca pearl, mint leaves, kalamansi peels, fennel root, and combinations of these ingredients. The fruit bits could be colored, flavored, and/or contain functional ingredients as listed above.

The alcoholic beverages may also comprise other ingredients to make different commercial products. For example, the alcoholic beverage may also comprise sugar to make sweetened beverages such as “alcopops”. The sugar content may be at least 10 wt. %, preferably at least 20 wt. % relative to the total weight of the beverage. The beverage may also contain other ingredients, such as food-grade acid(s), nutritive or non-nutritive sweetener(s), preservative(s), colouring(s), flavourings(s), or functional ingredients.

The additional ingredients and/or inclusions may be added after the resting period, either before or after adding the alcohol.

The alcoholic beverage described herein will remain stable for up to two years at room temperature, i.e. a temperature of between 15 and 25° C. By “stable”, it is meant that any inclusions will remain in suspension (i.e. little or no sedimentation will occur), and that little or no coagulation or flocculation occurs within a given time period.

It is preferred by consumers that alcoholic beverages are transparent, i.e. they have a low turbidity. A beverage is considered clear if it has a turbidity of less than 5 NTU. The inventors were able to produce transparent beverages, i.e. beverages having a turbidity of preferably at most 5.0 NTU, more preferably at most 4.5 NTU, even more preferably at most 4.5 NTU, even more preferably at most 4.0 NTU, even more preferably at most 3.5 NTU most preferably at most 3.0 NTU. Achieving such low turbidity in alcoholic beverages (in particular spirits and liqueurs having alcohol contents of preferably more than 20% ABV) containing water and hydrocolloids such as xanthan and galactomannans was highly surprising. This is because it is common general knowledge that in such complex systems, alcohol “separates” the water from the hydrocolloids which in turn causes an increase in turbidity. The present inventors surprisingly observed that such unwanted effect does not happen in the beverages of the invention and that they were able to manufacture alcoholic beverages containing said hydrocolloids which were practically transparent.

Alcoholic beverages produced by the method disclosed herein are also part of the present invention.

The use of xanthan and galactomannan in an alcoholic beverage is also part of the present invention.

Methods of Measurement

Viscosity, shear stress and yield stress of a beverage were determined by rheological measurements with a controlled stress rheometer (Paar Physica MCR300) equipped with a coaxial cylinder CC 24 and monitored by a Rheoplus/32 V2, Anton Paar. Shear stress values are measured at shear rates from 1 to 100 $s^{-1}$ with a 120 sec ramp, holding the sample at 20±0.1° C. with a Peltier temperature controlled system connected to an external thermostated water bath. Measurements are done in triplicate in each sample and 40 data points are collected for each flow curve. Experimental data are fitted to Newton ($\sigma=\eta\gamma$), Ostwald-De-Waele ($\sigma=K\gamma^{n}$), Bingham ($\sigma=\sigma_0+\eta'\gamma$) and Hershel-Bulkley ($\sigma=\sigma_0+\eta'\gamma^{p}$). The Hershel-Bulkley method was mainly used to characterize the samples of the invention. Viscosity values (η=σ/γ) and yield stress are used to characterize the flow behaviour of the beverage samples.

Turbidity: A measure of the clarity of a liquid. A liquid with high turbidity will appear cloudy or hazy, whilst one with low turbidity will appear clear. Turbidity is determined in Nephelometric Turbidity Units (NTU) using a nephelometer (also known as a turbidimeter, e.g. Hach 2100N-Germany), which measures the propensity of particles in the liquid to scatter light. A turbidimeter is calibrated using pre-mixed Formazin solutions (StabCal 26621-10, Hach-Germany) from 0.1, 20, 200, 1000, 4000 NTU.

The invention will now be described by the following non-limiting examples.

EXAMPLES

Examples 1 to 5

Alcoholic Beverages Comprising Xanthan and Galactomannan Stabilizers, Made with Method 1

Alcoholic beverages comprising xanthan (known as "Satiaxane® CX930" sold by Cargill) and locust bean gum (known as "Viscogum" sold by Cargill) were manufactured as follows:

a) A 60° C. solution containing 0.5 g of Xanthan in 99.5 g water and a 80° C. solution containing 0.5 g of LBG in 99.5 g water were made, allowed to cool at room temperature and mixed under stirring.

b) The solution of step a) was allowed to rest for 72 hours at room temperature.

c) The rested solution was mixed with the remaining ingredients to produce the final beverage.

The yield stress and viscosity of the final beverages was measured using known methods. The amounts of the ingredients were varied and the yield stress, and viscosity of the beverages were measured using known methods. The results are shown in table 1A. In each of the examples 1 to 5, a stable alcoholic beverage was formed.

The inclusions were gold flakes used in an amount of 0.2 wt %.

TABLE 1A

| Ex. no. | Water (%) | Alcohol (%) | Sugar (%) | CX930 (%) | Viscogum (%) | Yield stress (mPa) | Viscosity (mPa.s) |
|---|---|---|---|---|---|---|---|
| 1 | 52.0 | 37.5 | 10.4 | 0.05 | 0.05 | 9.7 | 20.8 |
| 2 | 52.1 | 37.5 | 10.4 | 0.0075 | 0.005 | 15.4 | 20.8 |
| 3 | 52.1 | 37.5 | 10.4 | 0.002 | 0.002 | 1.0 | 9.3 |
| 4 | 52.1 | 37.5 | 10.4 | 0.02 | 0.02 | 60.1 | 75.1 |
| 5 | 52.1 | 37.5 | 10.4 | 0.005 | 0.005 | 18.7 | 11.1 |

Examples 6 to 15

Alcoholic Beverages Comprising Xanthan and Galactomannan Stabilizers, Made with Method 2

Alcoholic beverages comprising xanthan (Satiaxane® CX930) and locust bean gum (Viscogum) were manufactured as follows:

a) A blend of xanthan and LBG was made in dry form in various ratios as specified in table 1B;

b) The blend was dissolved under high shear stirring, using a high shear mixer (Silverson type above 3000 rpm), in hot water (80° C.) in various concentrations ranging from 0.1 wt % up to 0.5 wt % relative to the total amount of the solution;

c) The solution was allowed to cool down at 25° C. while reducing the stirring speed to about 200 rpm;

d) After reaching the set temperature, the remaining ingredients (sugar syrup, buffering agent, alcohol and flavor) were added under stirring (200 rpm) until a homogeneous beverage was obtained (about 15 minutes);

e) Various particulates with various sizes and densities (see table 1C) and in various concentrations (0.05 wt % and 0.1 wt %) were added to the homogeneous beverage under stirring at 200 rpm.

The yield stress and viscosity of the final beverages were measured at various amounts of ingredients. The results are shown in table 1B. In each of the examples 6 to 16, a stable alcoholic beverage was formed.

TABLE 1B

| Ex. no. | Water (%) | Alcohol (%) | Sugar (%) | CX930 (%) | Viscogum (%) | Yield stress (mPa) | Viscosity (mPa.s) | Turbidity (NTU) |
|---|---|---|---|---|---|---|---|---|
| 6 | 49.93 | 20 | 10.40 | 0.031 | 0.069 | 12.66 | 13.398 | 3.13 |
| 7 | 35.69 | 37.1 | 10.40 | 0.078 | 0.021 | 36.434 | 138 | 3.64 |
| 8 | 52.26 | 29 | 10.40 | 0.055 | 0.015 | 32.657 | 9.5871 | 4.06 |
| 9 | 59.83 | 20 | 10.40 | 0.015 | 0.055 | 8.1712 | 12.398 | 2.65 |
| 10 | 69.43 | 20 | 10.40 | 0.026 | 0.015 | 12.58 | 31.29 | 3.74 |
| 11 | 35.08 | 38 | 10.40 | 0.051 | 0.048 | 25.257 | 126.04 | 3.99 |
| 12 | 43.14 | 28.1 | 10.40 | 0.052 | 0.048 | 24.694 | 167.37 | 3.82 |
| 13 | 43.42 | 28.1 | 10.40 | 0.055 | 0.044 | 28.875 | 209.2 | 3.54 |
| 14 | 45.39 | 29 | 10.40 | 0.045 | 0.046 | 18.04 | 96.44 | 2.94 |
| 15 | 45.39 | 29 | 10.40 | 0.045 | 0.046 | 23.357 | 171.6 | 4.43 |

TABLE 1C

| Particulate | Bulk density (g/cc) | Particle size (average mean diameter) |
|---|---|---|
| Orange pulp | 97.7 | 3.0 mm |
| Lemon pulp | 101.7 | 7.6 mm |
| Pomegranate cells | 73.4 | 9.0 mm |
| 23 ct Gold leaf | | 0.02 mm |

Example 6

Comparative Example—without a Galactomannan

TABLE 3

| Example | Alcohol % (v/v) | Sugar (g/l) | CX930 (g/l) | Viscogum (g/l) | Yield stress (mPa) | Viscosity (mPa.s) |
|---|---|---|---|---|---|---|
| 7 | 37.5 | 10.4 | 0.75 | 0.0 | No Yield stress | 208 |

The water was used in an amount up to 100%.

The inclusions did not float but sedimented immediately.

Example 7

Comparative Example—without Xanthan

A beverage was manufactured using the same method as in examples 1 to 5, except that no xanthan was added to the initial solution. LBG precipitated instantly and the beverage was unstable. The inclusions did not float, suggesting that xanthan is required in addition to LBG in order to stabilize the suspension.

When used in this disclosure and claims, the terms “comprises” and “comprising” and variations thereof mean that the specified features, steps or integers are included. The terms are not to be interpreted to exclude the presence of other features, steps or components.

Where ranges of values have been given in this disclosure, all intermediate values and end-points of the range form part of the disclosure. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Moreover, the following results proved the stability of xanthan and various galactomannans in an alcoholic environment. Solutions containing various amounts of sugar and alcohol were made at different pHs. The pH was adjusted with citric acid. Various amounts of Xanthan and guar gum were solubilized in water at 60° C. and LBG at 80° C. after which the solutions were allowed to cool to room temperature. FIGS. 1-3 show the stability of xanthan and galactomannans.

The invention claimed is:

1. An alcoholic beverage comprising:

at least 0.005 wt % of xanthan and at least 0.005 wt % of a galactomannan, wherein a total amount of xanthan and galactomannan is from 0.01 wt % to 0.21 wt %, alcohol, wherein the alcoholic beverage has an alcohol content of at least 15 vol % to at most 45 vol %, sugar in an amount of at least 10 wt %, inclusions suspended in the beverage, and optionally other ingredients comprising food-grade acids, nutritive or non-nutritive sweeteners, preservatives, colourings, flavourings, or functional ingredients;

wherein:

the xanthan and the galactomannan are in a weight ratio of between 80:20 and 20:80;

the alcoholic beverage is free of gellan gum;

the alcoholic beverage has a yield stress of at least 5.0 mPa at 20±0.1° C., and wherein the alcoholic beverage is stable at room temperature for up to two years.

2. The beverage of claim 1, wherein the xanthan and the galactomannan are in a weight ratio of between 75:25 and 25:75.

3. The beverage of claim 1, wherein the galactomannan is selected from the group consisting of fenugreek gum, guar gum, tara gum and locust bean gum (LBG).

4. The beverage of claim 1, wherein the galactomannan is LBG.

5. The beverage of claim 1 having a viscosity of at most 60 mPa·s.

6. The beverage of claim 1 having a pH of between 3 and 10.

7. The beverage of claim 1 further comprising inclusions suspended in the beverage, wherein the inclusions comprise microspheres, gel beads, fruit pieces, flakes, seeds, other plant products, other edible particulate matter, or combinations thereof.

8. The beverage of claim 7, wherein the inclusions have a size range of 0.1 mm to 10 mm.

9. The beverage of claim 7, wherein the beverage comprises 0.1 wt % to 2.0 wt % of the inclusions relative to the total weight of the beverage.

10. The beverage of claim 1, wherein the alcoholic beverage has a yield stress of 5.0 mPa to 80.0 mPa.

11. The beverage of claim 1, wherein the alcoholic beverage has an alcohol content of 15 vol % to 40 vol %.

12. A process for producing an alcoholic beverage, comprising the steps of:

providing a first solution of xanthan and a galactomannan, wherein the beverage comprises at least 0.005 wt % of xanthan and at least 0.005 wt % of the galactomannan, wherein a total amount of xanthan and galactomannan is from 0.01 wt % to 0.21 wt %;

allowing said first solution to rest for at least 1 h; and mixing said first solution with an aqueous solution comprising an alcohol to obtain a beverage having an alcohol content of at least 15 vol % and at most 45 vol %;

adding sugar, wherein the sugar is present in amounts of at least 10 wt %;

adding inclusions after the resting period; and optionally further adding other ingredients comprising food-grade acids, calcium sources, nutritive and non-nutritive sweeteners, preservatives, colourings, flavourings, functional ingredients, or combinations of two or more thereof;

wherein:

the xanthan and galactomannan are in a weight ratio between 80:20 and 20:80, the alcoholic beverage is free of gellan gum; and the alcoholic beverage has a yield stress of at least 5.0 mPa at 20±0.1° C.

* * * * *